US008510397B2

(12) United States Patent
Chapman et al.

(10) Patent No.: US 8,510,397 B2
(45) Date of Patent: Aug. 13, 2013

(54) METHOD AND APPARATUS FOR MESSAGE NOTIFICATION VIA RSS FEED

(75) Inventors: George B. Chapman, Goleta, CA (US); Orlando J. Warren, Venture, CA (US)

(73) Assignee: j2 Global Communications, Hollywood, CA (US)

( * ) Notice: Subject to any disclaimer, the term of this patent is extended or adjusted under 35 U.S.C. 154(b) by 331 days.

(21) Appl. No.: 12/954,056

(22) Filed: Nov. 24, 2010

(65) Prior Publication Data

US 2011/0110503 A1 May 12, 2011

Related U.S. Application Data

(63) Continuation of application No. 11/445,592, filed on Jun. 1, 2006, now abandoned.

(51) Int. Cl.
*H04M 1/64* (2006.01)
*H04N 1/413* (2006.01)

(52) U.S. Cl.
USPC ............................ 709/206; 709/203; 709/219

(58) Field of Classification Search
USPC .................. 709/217–219; 70/217–219, 203; 713/161, 168–170; 726/5
See application file for complete search history.

(56) References Cited

U.S. PATENT DOCUMENTS

| 5,675,507 A | 10/1997 | Bobo, II |
| 5,870,549 A * | 2/1999 | Bobo, II ........................ 709/206 |
| 6,181,781 B1 | 1/2001 | Porter et al. |
| 6,208,638 B1 | 3/2001 | Rieley et al. |
| 7,310,772 B2 * | 12/2007 | Whitfield ........................ 715/205 |
| 2003/0169730 A1 | 9/2003 | Narasimhan et al. |
| 2005/0010635 A1 | 1/2005 | Schwesig et al. |
| 2005/0094779 A1 | 5/2005 | Kleinfelter et al. |
| 2005/0267973 A1 | 12/2005 | Carlson et al. |
| 2006/0028691 A1 * | 2/2006 | Shinomiya .................... 358/402 |
| 2006/0143307 A1 | 6/2006 | Codignotto |
| 2006/0215936 A1 | 9/2006 | Dorfman et al. |
| 2006/0264204 A1 | 11/2006 | Livingood |
| 2007/0077921 A1 | 4/2007 | Hayashi et al. |

FOREIGN PATENT DOCUMENTS

WO WO 03/084165 A1 10/2003

OTHER PUBLICATIONS

Fagan Finder, "All About RSS", Mar. 29, 2006, http://www.faganfinder.com/search/rss.shtml, (Mar. 29, 2006), [pp. 1-7].
PCT International Search Report (dated Nov. 2, 2007), International Application No. PCT/US2007/012399—International Filing Date May 24, 2007, (Nov. 2, 2007), [17 pages].
Non-Final Office Action (dated Apr. 24, 2009), U.S. Appl. No. 11/445,592, filed Jun. 1, 2006, First Named Inventor: George B. Chapman, (19 pages).
Final Office Action (dated Mar. 12, 2010), U.S. Appl. No. 11/445,592, filed Jun. 1, 2006, First Named Inventor: George B. Chapman, (16 pages).

(Continued)

Primary Examiner — Thai Nguyen
(74) Attorney, Agent, or Firm — Blakely, Sokoloff, Taylor & Zafman LLP

(57) ABSTRACT

Methods of receiving audio transmissions over a telecommunication connection, extracting information about the transmissions, and publishing the information to an RSS feed are described and claimed. Systems and software using the methods are also described and claimed.

22 Claims, 6 Drawing Sheets

(56) References Cited

OTHER PUBLICATIONS

Non-Final Office Action (dated Aug. 24, 2010), U.S. Appl. No. 11/445,592, filed Jun. 1, 2006, First Named Inventor: George B. Chapman, (16 pages).

"Technology at Harvard Law—RSS 2.0 Specification", Berkman Center, Internet Citation, Jan. 8, 2002; XP-002369234, Retrieved from the Internet: URL:http://blogs.law.harvard.edu/tech/rss [retrieved Feb. 22, 2006], (Jan. 8, 2002), [7 pages].

"What is RSS", Fax Group, http://whatis.techtarget.com/rssLanding/0,295701,sid9_gci827309,00.html, [Jan. 9, 2006], (pp. 3 of 5 through 4 of 5).

Jander, Mary, "Unified Messaging One-for-All Mail Call", Data Communications, McGraw Hill, New York, USA, vol. 27, No. 8, May 21, 1998, XP-000755589; ISSN: 0363-6399, (May 21, 1998), [pp. 78-88].

Jardin, Xeni, "Why RSS Is Everywhere", WIRED Magazine, Issue 12.04, Apr. 2004, http://www.wired.com/wired/archive/12.04/start.html?pg+7, (Apr. 2004), [pp. 1-4].

* cited by examiner

METHOD AND APPARATUS FOR MESSAGE NOTIFICATION VIA RSS FEED

RELATED MATTERS

This application is a continuation of pending U.S. application Ser. No. 11/445,592, filed Jun. 1, 2006, entitled "Method and Apparatus for Message Notification Via RSS Feed", currently pending.

FIELD

An embodiment of the invention relates generally to telecommunications services, and more specifically, to notification and delivery of voicemail and facsimile messages. Other embodiments are also described.

BACKGROUND j2 Global Communications of Hollywood, Calif., offers a range of services that deliver traditional public switched telephone network ("PSTN") voice messages and facsimile transmissions to the recipient using Multipurpose Internet Mail Extension ("MIME") electronic mail ("e-mail") and the Hypertext Transfer Protocol ("HTTP"). For example, one service accepts facsimile messages directed to a predetermined telephone number, and notifies a subscriber associated with the number by transmitting an e-mail message to the subscriber's e-mail box. After opening the e-mail message, the subscriber can view and/or download an image of the facsimile by accessing a web site identified by a link in the e-mail message with her web browser program. A second service accepts voice mail (audio) messages over the standard telephone connection and can notify the subscriber by sending an e-mail message to her, alerting her to call in to her voicemail box.

SUMMARY

Embodiments of the invention respond to requests for summary aggregation items by preparing and transmitting structured documents containing information about recently-received telecommunication messages.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
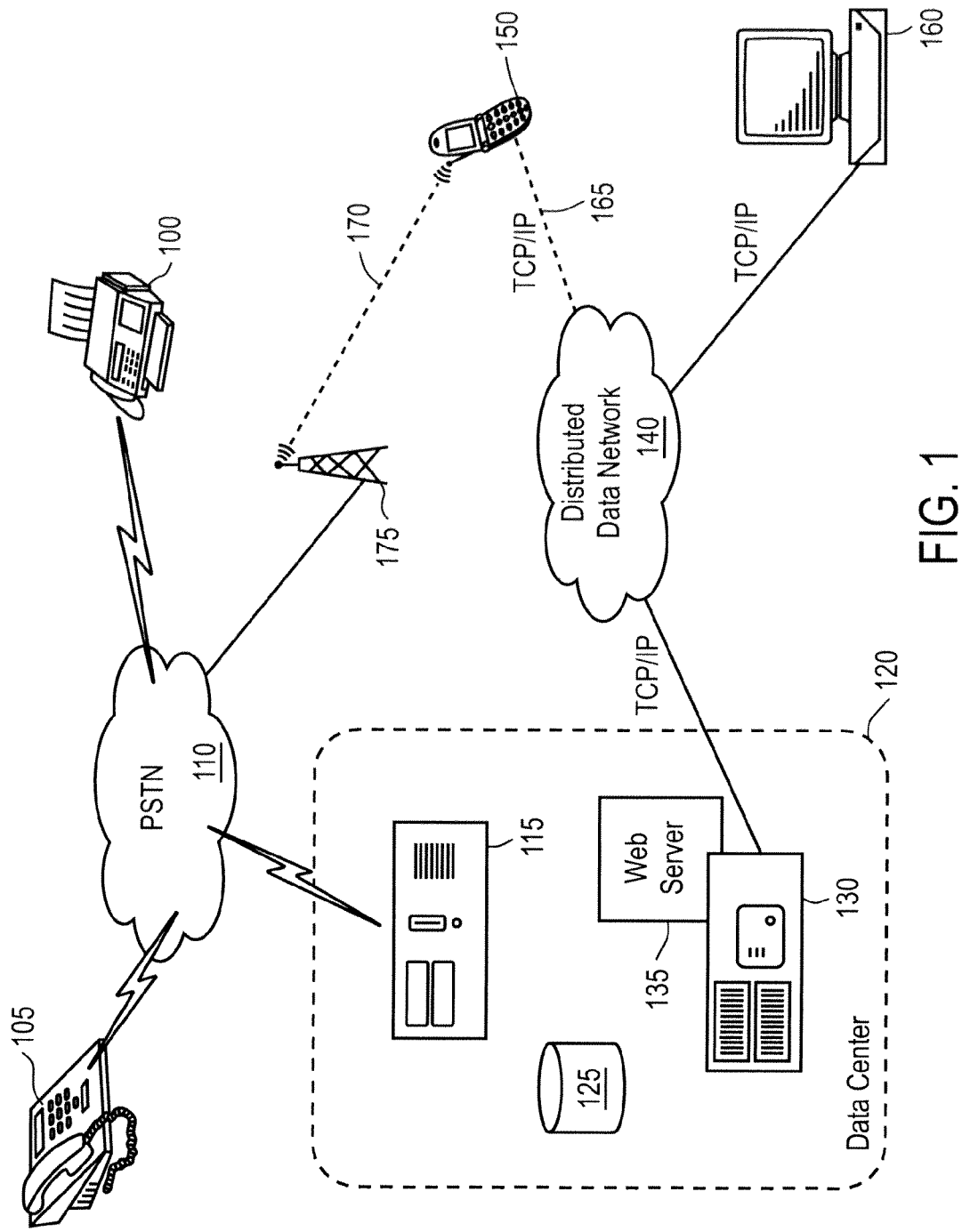
FIG. 1 shows an environment including a number of devices that can interact according to an embodiment of the invention.

FIG. 1 shows various devices and systems that may be part of an environment operating according to an embodiment of the invention. These devices may interact as described generally here; several aspects of the interactions will be examined in greater detail below.

First, a telecommunication device such as a facsimile machine 100 or an ordinary telephone 105 transmits a message (in this case, a voice message or a facsimile) across public switched telephone network ("PSTN") 310 to a computer server 115 in data center 120. Server 115 contains interface hardware such as a sound digitizer or facsimile modem to permit it to receive the audio signal carried by the PSTN, and software to control the hardware and to perform other operations discussed here.

The telecommunication message may be converted to a digital form for easier manipulation by server 115 (and other computers), and may be saved on a mass storage device such as hard disk 125. For example, a facsimile message containing images of one or more pages may be saved in a graphic format such as the Tagged Image File Format ("TIFF"), Graphic Interchange Format ("GIF"), Joint Photographic Experts Group ("JPEG") format, Portable Network Graphics ("PNG") format, or other similar format. Voice (audio) messages may be stored without compression (for example, as Windows' Wave ("WAV") files), with lossless compression (e.g. using the Free Lossless Audio Codec or "FLAG" format), or with lossy compression (e.g. as MPEG-1 Audio Layer 3 or "MP3" files). ("MPEG" stands for "Moving Picture Experts Group," a working group of ISO/IEC, the International Standards Organization and International Electrotechnical Commission, in charge of the development of standards for coded representation of digital audio and video.) A more sophisticated embodiment could accept and store a message containing both audio and video data, such as might be produced by a video telephone (not shown).

Another server 130 in data center 120 may operate a web server 135 to respond to Hypertext Transfer Protocol ("HTTP") requests from peer machines that connect to the server via a distributed data network 140 such as the Internet. The subscriber associated with a phone number on the PSTN that received the facsimile or voice mail message may configure client software on a device such as a mobile phone 150 or computer system 160, and the client may periodically poll web server 135 to obtain information about recently-received messages intended for the subscriber. When such a message has been received and stored, syndication logic (not shown) associated with web server 135 may prepare a specially-formatted reply to send in response to the client's polling request. The client may display information in the reply and the subscriber can review it and, if desired, retrieve the message or facsimile itself through another data connection to web server 135.

Those of skill in the relevant arts will recognize that the specific distribution of functions among systems shown in datacenter 120 is not significant. An embodiment of the invention may consolidate all functions onto a single system, distribute them across several systems, or even subdivide the functions into smaller units within the data center. Functions may be performed by geographically distributed systems. This may be favored when inbound messages are to be accepted at telephone numbers belonging to exchanges (area codes) that are located around the United States and/or around the world.

FIG. 1 also illustrates a point that may cause confusion in analyzing a system according to an embodiment of the invention. Note that mobile phone 150 is shown interacting with web server 135 through a data connection 165 carried across distributed data network 140 by a data transfer protocol such as the Internet Protocol ("IP") (indicated here as "TCP/IP," where "TCP" stands for "Transmission Control Protocol," a higher-level protocol that is built on IP). However, mobile phone 150 may actually perform all its low-level communication signaling functions by exchanging radio signals 170 with a cellular tower 175; the signals (and data encoded therein) may travel from mobile phone 150 to web server 135 at least partly over PSTN 110. In general, PSTN 110 may overlap somewhat with distributed data network 140. However, the two classes of data (audio telecommunication signals from devices like facsimile machine 100 and telephone 105; and TCP/IP data flowing between server 130 and clients 150 and 160) should be carefully distinguished.

Figure 2:
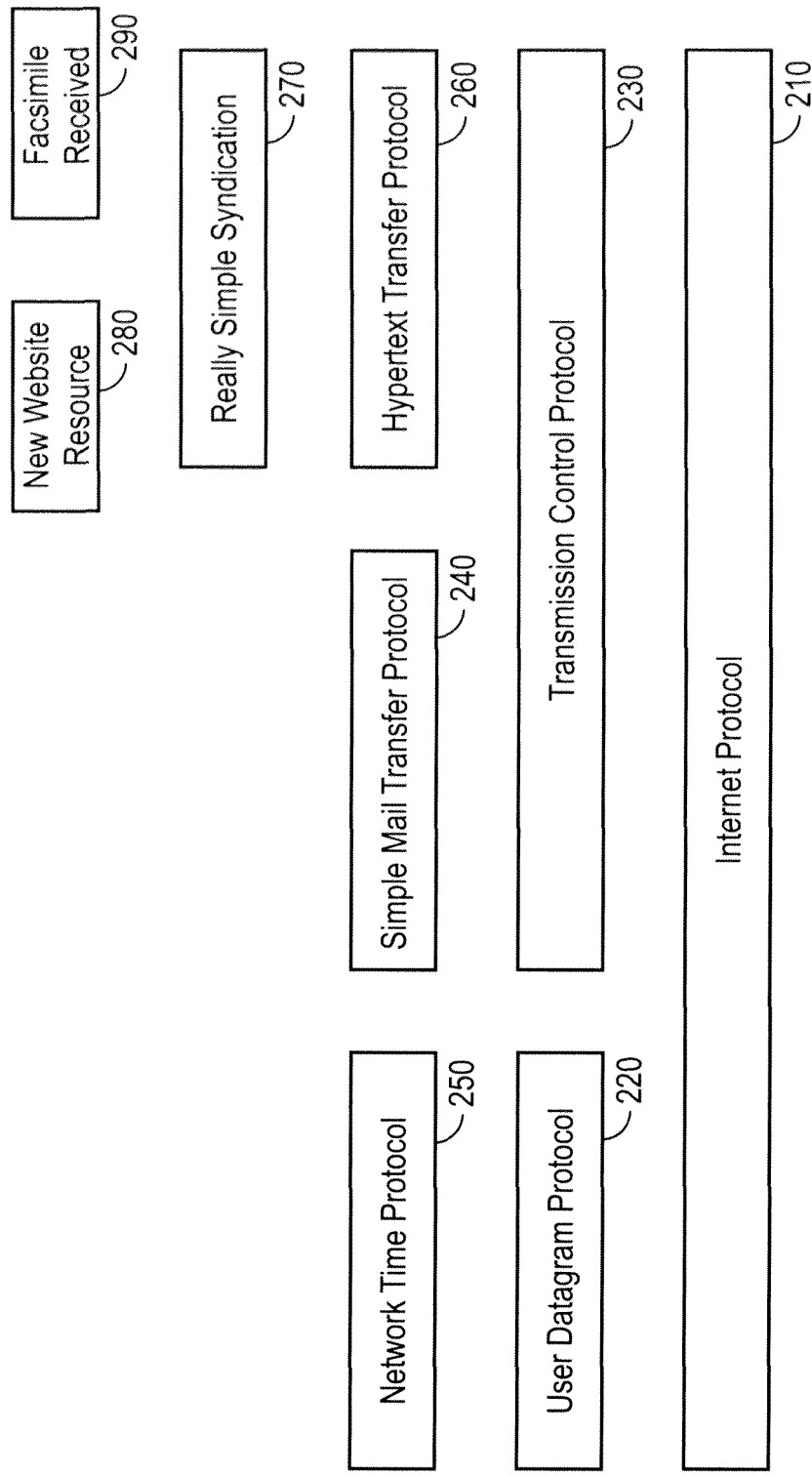
FIG. 2 shows a diagram of data transfer protocols, and indicates where an embodiment of the invention may operate.

FIG. 2 shows a diagram of relationships between data transfer protocols. Distributed data networks that are based on the low-level Internet Protocol ("IP," 210) and datagram- or stream-oriented data exchange protocols such as the User Datagram Protocol ("UDP," 220) and Transmission Control Protocol ("TCP," 230) (collectively, "TCP/IP networks") provide communication facilities that can support a wide range of applications. Many higher-level protocols have been devised to adapt the basic data exchange capabilities of TCP and/or UDP to the specific needs of a particular application. For example, the Simple Mail Transfer Protocol ("SMTP," 240) is often used to deliver electronic mail ("e-mail") from a sender to a recipient's mail server, and the Network Time Protocol ("NTP," 250) is used to help synchronize real-time clocks of a group of computers.

The Hypertext Transfer Protocol ("HTTP," 260), which was originally developed to support the Worldwide Web envisioned by Sir Tim Berners-Lee, has become particularly widely adopted. The flexibility, power and common availability of its current feature set make it an attractive choice for carrying data for new end-user applications and a good basis for more specialized protocols.

One HTTP-refinement protocol that has become increasingly popular is used to aggregate information and notifications from a number of sources. RSS 270 (which may stand for "Really Simple Syndication" or "Rich Site Summary") uses HTTP (or its more-secure sibling HTTPS) to retrieve an Extensible Markup Language ("XML") document from an HTTP server. The XML document generally contains a synopsis of recent additions or resources available at a web site hosted by the server. RSS provides an efficient way to obtain a short summary of new material that may be of interest to a user, without requiring the user to retrieve and examine all the available material. This may be useful if the user has a small, limited capability device such as a mobile phone or personal digital assistant ("PDA"), which cannot display a large amount of information effectively. The user can examine the item synopses in the RSS feed and decide whether to seek out the full versions.

RSS feed items may describe new material available at a website or weblog ("blog") 280 or new messages received for the subscriber through a telecommunication connection 290.

Client software to retrieve and display RSS feed items often aggregates a number of feeds into a single display. Thus, although a single feed may only contain items from one source, the small size and relatively uniform structure of RSS items permits a "feedreader" to prepare a consolidated view of news from a variety of disparate sources. RSS items conform to a relatively simple data structure, so it is possible to create feeds to deliver notifications of many different events, all of which may be consolidated and presented to a user through a single RSS client. This consolidation and uniform presentation may be desirable even for fully-featured client systems.

Figure 3:
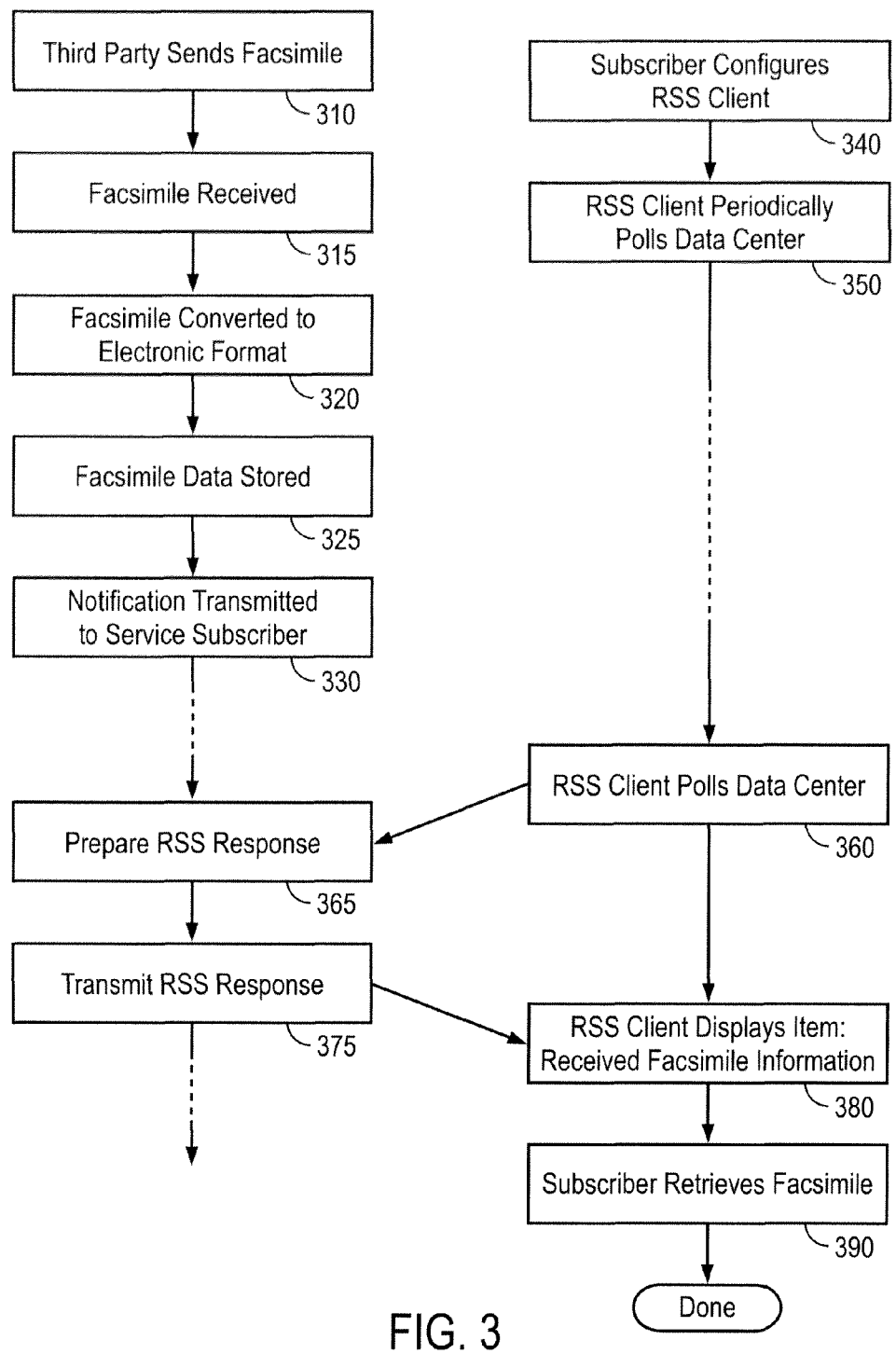
FIG. 3 shows example sequences of operations that may occur on a server and a client in an embodiment of the invention.

FIG. 3 shows how a traditional telecommunication service can be enhanced with RSS notification according to an embodiment of the invention. The process begins when a third party sends a facsimile 310. The sender directs the transmission to a telephone number associated with a subscriber to a fax-to-email service (such as j2 Global's eFax™ service).

The facsimile is received 315 at a datacenter equipped with inbound telephone facilities (including facsimile modems to receive such transmissions) and converted to an electronic format 320 for more convenient storage. Facsimile data is often received in Tagged Image File Format ("TIFF"), but can be converted and stored in any convenient format. Useful formats include the Graphic Interchange Format ("GIF"), Joint Photographic Experts Group ("JPEG"), and Portable Network Graphics ("PNG").

The facsimile data may be stored 325 and, in some embodiments, a notification may be transmitted to the service subscriber 330. This notification may be sent by electronic mail, a cellular phone or pager facility, or other mechanism. The notification may be considered a "push" notification, since it is sent after the facsimile is received, regardless of whether the service subscriber is ready or waiting for it.

In an independent sequence of events, the subscriber configures an RSS client program 340 to poll an RSS server at the datacenter. Subsequently, the RSS client periodically polls the server 350 to obtain RSS items describing newly-received facsimile messages. Eventually, after the facsimile is received and stored, the RSS client will poll the data center 360, and a server at the data center will prepare an RSS response 365 and transmit the response to the RSS client 375. The RSS client will display information about the received facsimile that was extracted from the facsimile or collected by the inbound facsimile server, and the subscriber can retrieve the document stored earlier 390.

As described in this sequence, the RSS feed is a "pull" system: the subscriber's RSS client issues periodic requests to an RSS server and receives new RSS items when they become available. Arranging to produce an RSS item in response to a client's periodic request is known as publishing the item to a syndication feed.

Although FIG. 3 discusses operations of an embodiment of the invention in relation to the receipt and notification of a facsimile message, embodiments may also be used to alert a subscriber to the occurrence of other telecommunication events. For example, a datacenter may accept voice or audio/video messages for a subscriber and produce RSS items containing information about those messages.

One aspect of the method described above bears closer consideration. Although many web sites offer their resources to any client, the facsimiles, voice and text messages, and other telecommunication events involved in an embodiment of the invention are usually intended for a specific recipient only. Thus, a publishing procedure that notified all clients about a message intended for only one client would be of little use. However, since RSS is built upon HTTP, the latter protocol's authentication functionality can be used to distinguish requests from various subscribers' feedreaders, and to restrict access to the intended recipient. A subscriber's RSS client should preferably be configured with a Uniform Resource Locator ("URL") that selects items in the desired syndication format (discussed below), with a username or other identifier and, optionally, with a password, to permit the server that delivers the RSS item to identify and authenticate the RSS client. In one embodiment of the invention, the subscriber's telephone number may be used to identify the subscriber's RSS client. This may be the same number at which the incoming facsimile or voice message was initially received by the data center. In another embodiment, the subscriber's electronic mail address may be used to identify the subscriber's RSS client.

RSS items are commonly structured in accordance with one of a small number of specifications. An early RSS specification entitled RSS-0.91, by Dan Libby, was released Jul. 10, 1999. A more recent specification is RSS-1.0, described in a document released on Dec. 12, 2000 by members of the RSS-DEV working group. (The acronym "RSS" in RSS-1.0 stands for "RDF Site Summary," where "RDF" itself is an acronym for "Resource Description Framework," a "language for representing information about resources in the World Wide Web" recommended by the World Wide Web Consortium ("W3C") in a document entitled *RDF Primer* (current revision dated Feb. 10, 2004)).

RSS-2.0 is a newer specification set forth by the RSS Advisory Board and first published by UserLand on Aug. 19, 2002. Updated versions have been proposed and adopted from time to time. Finally, the Atom Syndication Format has been described in a Request For Comments ("RFC") document prepared by the Internet Engineering Task Force ("IETF") (RFC4287, December 2005).

These specifications (RSS-0.91, RSS-1.0, RSS-2.0 and Atom) have a convoluted history, but all offer adequate functionality to support an embodiment of the invention. Conversely, an embodiment of the invention may support any or all of these syndication schemes by producing appropriately-formatted items in response to client queries. Typically, an RSS client selects the syndication format it desires by the Uniform Resource Locator ("URL") it uses to access the RSS feed. For example, an RSS-1.0 client may request "http://www.example.com/rss-feed-1.xml", while an RSS-2.0 client may request "http://www.example.com/rss-feed-2.xml" instead. Identification and authentication information may be appended to the URL or passed separately in a request header, as described in RFC2616, describing the Hypertext Transfer Protocol.

An RSS item may contain information such as the date and time a facsimile was received by the data center, the number of pages received, the telephone number of the sender's machine, and/or a transmitting station name. This information may have been extracted from the message by the receiving server, or noted by the server when the message was received. Some syndication specifications permit an item to include an image; if that functionality is available, a reduced-scale ("thumbnail") image of a received page or a detail extracted from a page may be transmitted with the item and displayed by the feedreader. Syndication items may also contain a URL or similar hyperlink that can be activated to cause the feedreader (or another client program, commonly known as a "web browser") to retrieve the facsimile from storage at the datacenter and display it to the subscriber. RSS items associated with other telecommunication messages such as voice messages may cause an audio player to be launched to "display" the message.

Figure 4:
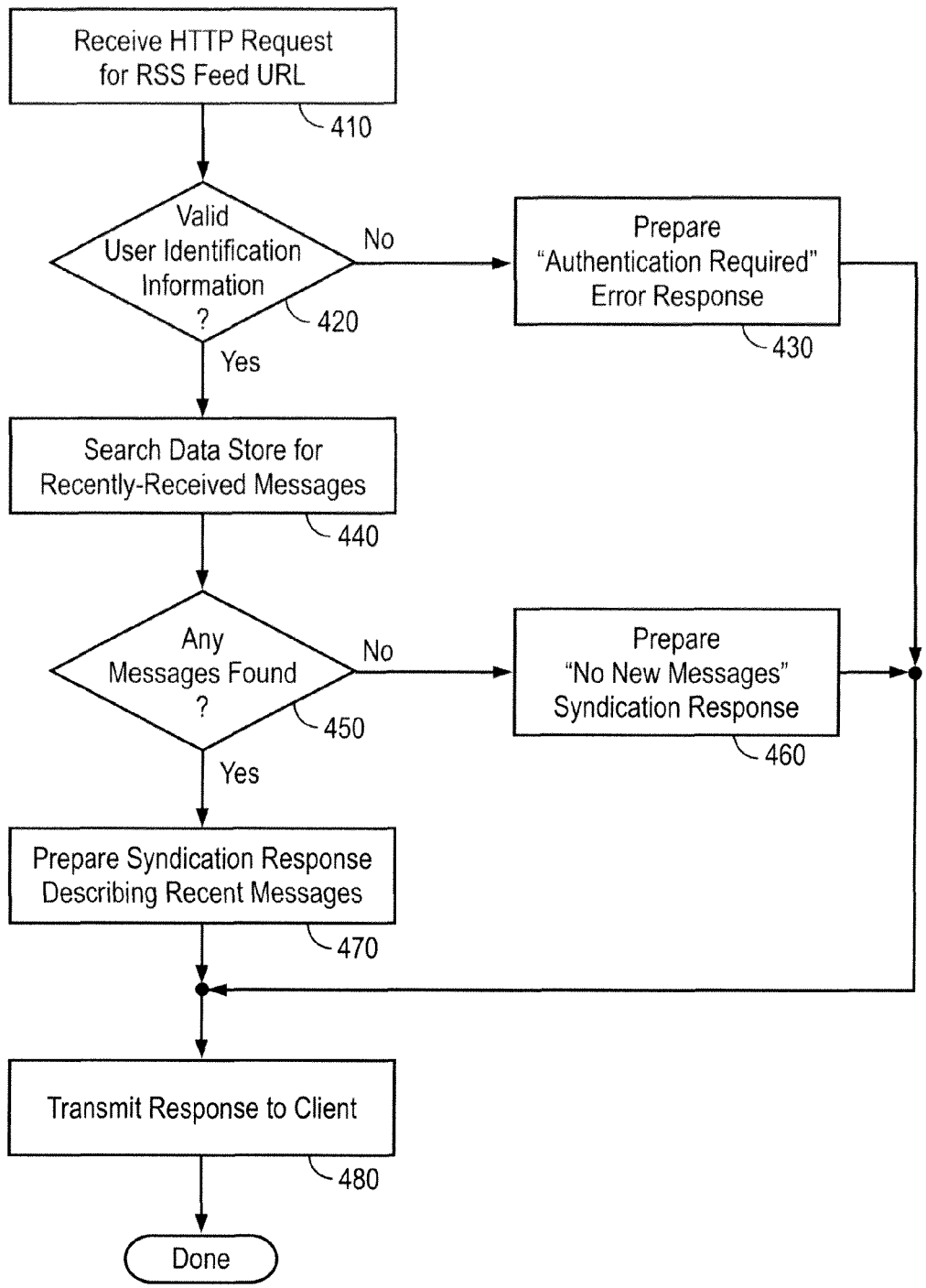
FIG. 4 is a flow chart of operations of a web server that implements an embodiment of the invention.

FIG. 4 is a flow chart showing operations of an HTTP server (web server) that implements an embodiment of the invention. The web server may be a special-purpose program designed solely to deliver RSS notifications of recently-received telecommunication messages or an ordinary general-purpose web server with auxiliary modules added to perform the operations shown here. The latter arrangement will be discussed briefly below.

First, the web server receives an HTTP request from a client. The request includes a Uniform Resource Locator ("URL") that describes the desired RSS feed (410). The web server examines identification information transmitted with the request to determine whether a valid user identification has been received (420). This examination may include validating a password or other cryptographic token.

If the user identification is invalid, the web server prepares an error response describing the problem (430). Otherwise, it searches for stored messages intended to be delivered to the subscriber (440). If no messages are found (450), a response indicating this is prepared (460). If there are new messages, the web server prepares a syndication response conforming to the appropriate structure; the response describes the messages found (470). Finally, the response is transmitted to the client according to the HTTP protocol (480).

In the description of the flow chart of FIG. 4, "the web server" is said to perform various functions to implement this embodiment of the invention. Of course, an ordinary web server lacks the logic functions to perform some of the operations described. However, many web server programs can be augmented with a "plug in" software module to extend the server's basic functionality. Other web servers can be configured to execute an external program to prepare a response for a client. (These external programs are often called "CGI scripts," for Common Gateway Interface. Both plug-in modules and CGI scripts may have access to information transmitted from the feedreader client, and can prepare responses that are transmitted back to the feedreader by the web server.) Thus, an embodiment of the invention may be structured as a loadable plug-in module for a web server or as a CGI script that searches a data store for recently received facsimiles or voice messages and constructs an XML document containing synopses of these messages.

Figures 5A, 5B:
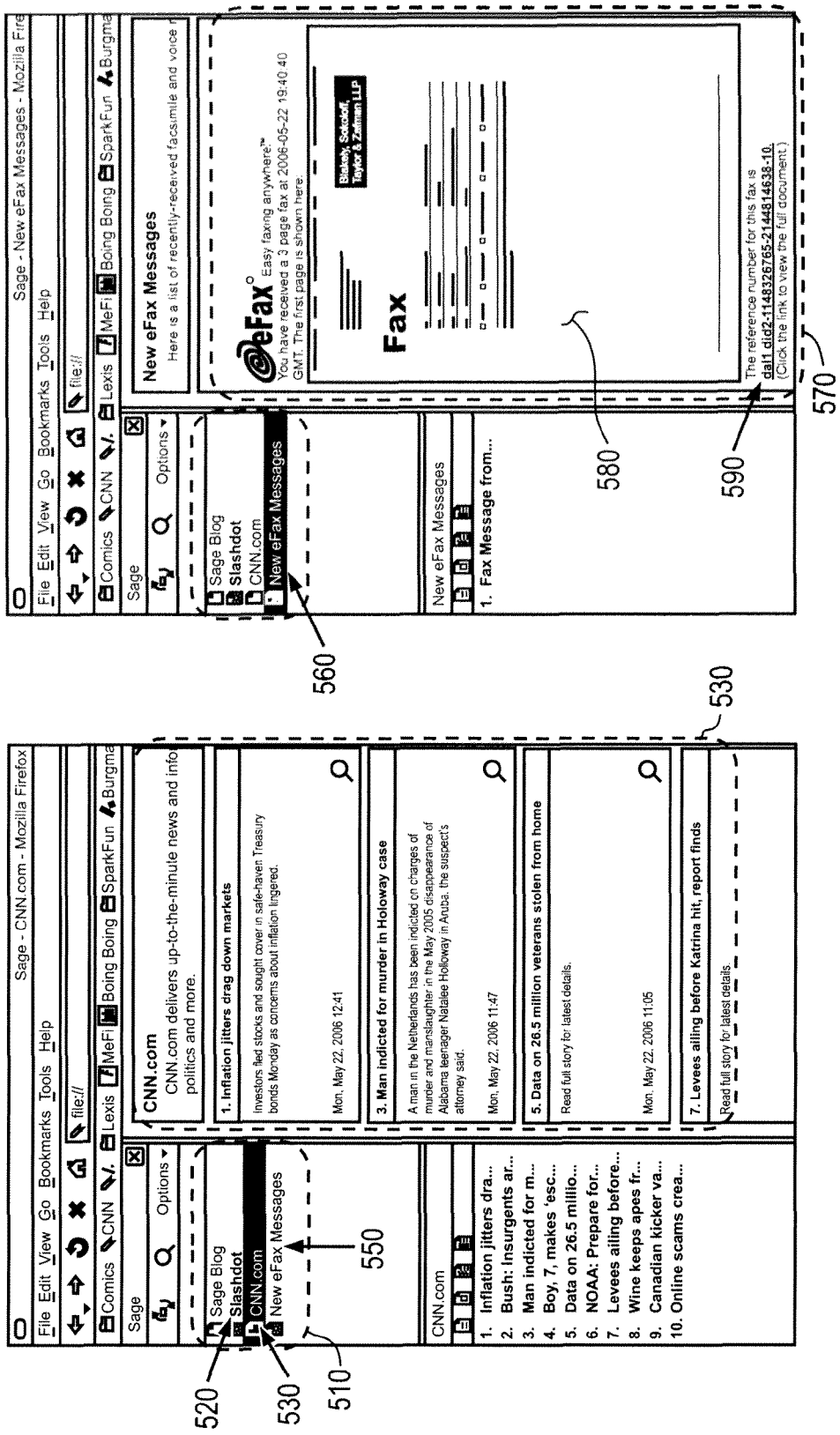
FIGS. 5A and 5B show screen captures of a syndication client displaying summary aggregation items.

FIG. 5A shows a portion of a display screen of an RSS client. Element 510 indicates a list of RSS feeds that the client is configured to monitor. Bold-face feeds (e.g. 520) indicate the availability of new synopses from that feed. In this screen shot, an RSS feed from the popular news web site CNN.com 530 is selected, and synopses of news stories are displayed in area 540. Element 550 represents an RSS feed for recently-received facsimiles; the bold type indicates that new information is available.

In FIG. 5B, the eFax RSS feed 560 has been selected, and information about a recently-received facsimile is presented at 570, including a reduced-scale image of the first page 580 and a hyperlink 590 to view the complete facsimile.

Figure 6:
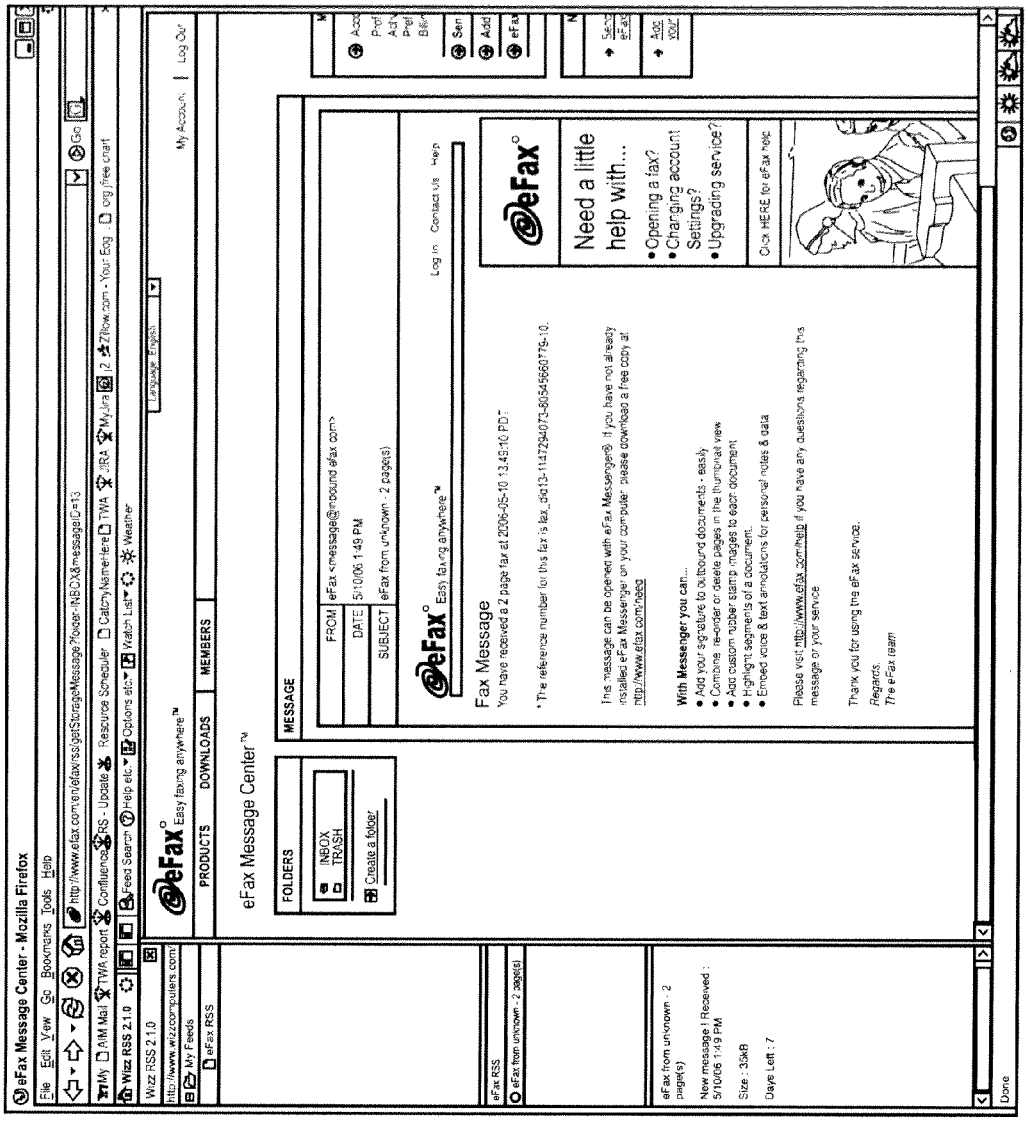
FIG. 6 shows a screen capture of a different embodiment of the invention.

FIG. 6 is a screenshot of another possible arrangement of information about received facsimile messages that may be prepared according to an embodiment of the invention.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A non-transitory machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that RSS notification of received telecommunication messages can also be produced by software and hardware that distribute the functions of embodiments of this invention differently than herein described. Such variations and implementations are understood to be captured according to the following claims.

What is claimed is:

1. A method comprising:
receiving a telecommunication transmission via a telecommunication connection at a telephone number assigned to a subscriber;
extracting information about the received telecommunication transmission;
receiving a request from a syndication feed client for a syndication feed Uniform Resource Locator ("URL");
examining the request for the syndication feed URL to determine that a valid subscriber's telephone number and password have been embedded in the request;
authenticating the syndication feed client using the subscriber's telephone number and password that are embedded in the request for the syndication feed URL; and
publishing the extracted information about the received telecommunication transmission to a syndication feed.

2. The method of claim 1 wherein the syndication feed delivers items that conform to at least one of an RSS-1.0 format, an RSS-2.0 format, or an Atom format.

3. The method of claim 1, further comprising:
storing data derived from the received telecommunication transmission in a mass storage system, the data to be accessible via a Uniform Resource Locator ("URL") included with information published to the syndication feed; and
transmitting the data to the client that requests the URL.

4. The method of claim 1 wherein the received telecommunication transmission is a facsimile transmission.

5. The method of claim 4, further comprising:
transmitting one of a reduced-size image of a page of the facsimile transmission or an excerpt from a page of the facsimile transmission with a syndication feed item.

6. The method of claim 1 wherein the received telecommunication transmission is a voice message.

7. The method of claim 1 wherein the telecommunication connection is a telephone connection.

8. The method of claim 1 wherein the extracted information includes at least one of a telephone number associated with the received telecommunication transmission, a station name associated with the received telecommunication transmission, or a number of pages associated with the received telecommunication transmission.

9. The method of claim 1 wherein receiving the request for a syndication feed URL comprises receiving the subscriber's telephone number and password embedded in a header of the request.

10. The method of claim 1 wherein the extracted information about the received telecommunication transmission is published in response to the syndication feed client being authenticated.

11. A system comprising:
a computer to receive a message transmission over a telephone network for a subscriber at a telephone number assigned to the subscriber;
a storage device to store message data for the subscriber about the received message transmission;
a server computer executing instructions to: (a) respond to Hypertext Transfer Protocol ("HTTP") requests from systems that connect to the server computer via a distributed communication network, (b) receive a request for an RSS feed Uniform Resource Locator ("URL") from an RSS client of the subscriber, (c) examine the received request to find the subscriber's assigned telephone number and a password which are embedded in the request for the URL,
(d) authenticate the RSS client of the subscriber using the subscriber's assigned telephone number and the password that are embedded in the request for the URL, and
(e) produce an RSS item describing the received message transmission, in response to the RSS client being authenticated.

12. The system of claim 11, further comprising:
a data exchanger to convert the received message transmission into a digital form for the computer.

13. The system of claim 11 wherein the RSS item comprises at least one of:
a telephone number of a sender of the received message transmission;
a station name of the sender;
a time at which the received message transmission was received;
a number of pages received in the received message transmission where the transmission is a facsimile transmission; and
a Uniform Resource Locator ("URL") to access the stored message data.

14. The system of claim 11, further comprising:
an electronic mail server to transmit a notification of the received telecommunication transmission to an electronic mail address of the subscriber.

15. The system of claim 11 wherein the server computer is to receive the request for the RSS feed URL from a mobile telephone.

16. The system of claim 11 wherein the server computer receives the subscriber's telephone number and password embedded in a header of the request for the RSS feed URL.

17. A non-transitory machine-readable medium comprising stored instructions that program a machine to provide a message notification service to a subscriber, wherein the programmed machine is to:
receive a Hypertext Transfer Protocol ("HTTP") request from a feedreader;
examine the HTTP request to determine that a telephone number and password that are associated with the subscriber have been embedded in the HTTP request and are valid;
identify the subscriber as being associated with the feedreader;
authenticate the feedreader using the telephone number and password associated with the subscriber that are embedded in the HTTP request;
search for stored telecommunication messages for the subscriber;
prepare a syndication item describing one of the stored telecommunication messages; and
transmitting the syndication item to the feedreader.

18. The non-transitory machine-readable medium of claim 17, containing additional instructions that program the machine to format the syndication item as an Extensible Markup Language ("XML") document.

19. The non-transitory machine-readable medium of claim 17 wherein the stored telecommunication message described in the syndication item was received at the telephone number associated with the subscriber.

20. The non-transitory machine-readable medium of claim 17 wherein the instructions for the searching and preparing are structured as a plug-in module for a web server.

21. The non-transitory machine-readable medium of claim 17 wherein the instructions for the searching and preparing are structured as a Common Gateway Interface ("CGI") script to be executed by a web server.

22. The non-transitory machine-readable medium of claim 17 wherein the telephone number and password associated with the subscriber are embedded in a header of the reveived HTTP request.

* * * * *

UNITED STATES PATENT AND TRADEMARK OFFICE
CERTIFICATE OF CORRECTION

PATENT NO. : 8,510,397 B2
APPLICATION NO. : 12/954056
DATED : August 13, 2013
INVENTOR(S) : George B. Chapman et al.

It is certified that error appears in the above-identified patent and that said Letters Patent is hereby corrected as shown below:

In the Claims, Column 9, Claim 22, line 12, please delete "reveived" and insert --received--.

Signed and Sealed this
Twenty-sixth Day of November, 2013

Margaret A. Focarino
*Commissioner for Patents of the United States Patent and Trademark Office*